United States Patent [19]
Kyser

[11] 4,393,384
[45] Jul. 12, 1983

[54] INK PRINTHEAD DROPLET EJECTING TECHNIQUE

[75] Inventor: Edmond L. Kyser, Portola Valley, Calif.

[73] Assignee: System Industries Inc., Milpitas, Calif.

[21] Appl. No.: 271,015

[22] Filed: Jun. 5, 1981

[51] Int. Cl.³ .............................................. G01D 15/16
[52] U.S. Cl. .................................. 346/1.1; 346/140 R
[58] Field of Search .................................. 346/140, 1.1

[56] References Cited

U.S. PATENT DOCUMENTS

| | | | |
|---|---|---|---|
| 3,683,212 | 8/1972 | Zoltan | 346/140 X |
| 3,832,579 | 8/1974 | Arndt | 346/140 X |
| 3,840,758 | 10/1974 | Zoltan | 310/8.1 |
| 3,857,049 | 12/1974 | Zoltan | 310/8.1 |
| 3,946,398 | 3/1976 | Kyser | 346/140 X |
| 4,024,544 | 5/1977 | Vernon | 346/140 X |
| 4,034,380 | 5/1977 | Isayama | 346/140 |
| 4,072,958 | 2/1978 | Hayami | 346/140 |
| 4,074,284 | 2/1978 | Dexter | 346/140 |
| 4,104,646 | 8/1978 | Fischbeck | 346/140 R |
| 4,112,433 | 9/1978 | Vernon | 346/140 |
| 4,126,867 | 11/1978 | Stevenson | 346/140 |
| 4,184,168 | 1/1980 | Isayama | 346/140 |
| 4,184,169 | 1/1980 | Taylor | 346/140 |
| 4,189,734 | 2/1980 | Kyser | 346/140 X |
| 4,284,996 | 8/1981 | Greve | 346/140 |
| 4,291,316 | 9/1981 | Kakeno | 346/140 |

*Primary Examiner*—Joseph W. Hartary
*Attorney, Agent, or Firm*—Limbach, Limbach & Sutton

[57] ABSTRACT

A method of ejecting individual ink droplets on demand from an enclosed ink chamber through a nozzle wherein the pressure of ink within the chamber is controlled to maximize the positive droplet ejecting pressure while controlling the negative pressure cycle to prevent cavitation, and also to return the ink pressure to its steady state static value quickly in preparation for another droplet ejection. The ink pressure is controlled by controlling the volume of the ink chamber and the rate at which it is changed.

2 Claims, 14 Drawing Figures

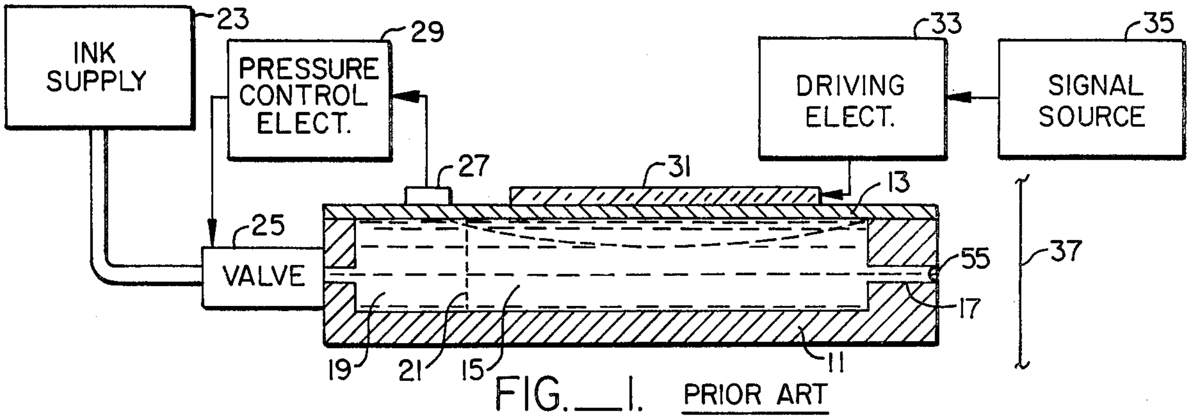
FIG._1. PRIOR ART
FIG._3A.
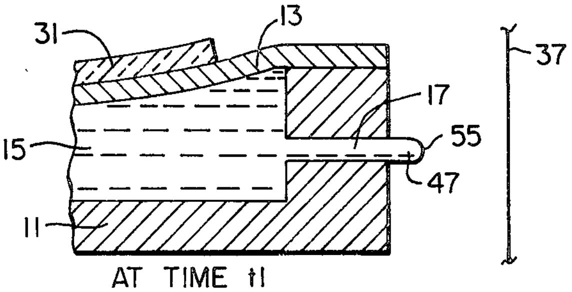
AT TIME t1
FIG._3B.
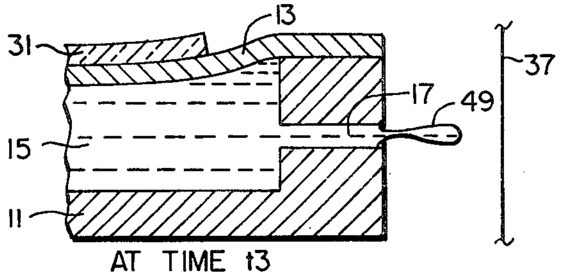
AT TIME t3
FIG._3C.
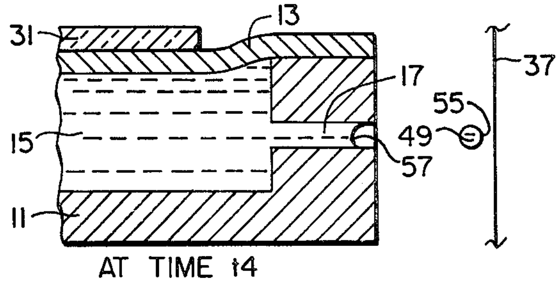
AT TIME t4
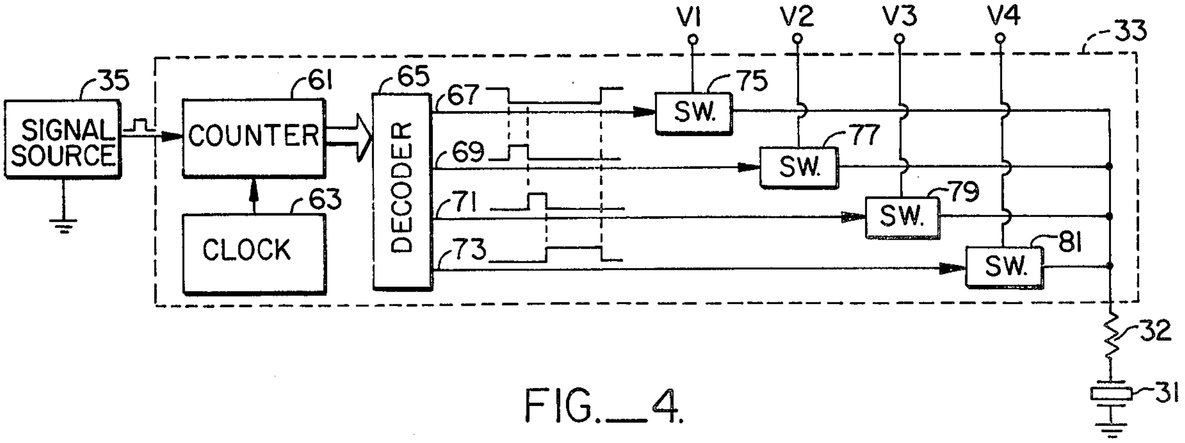
FIG._4.

INK PRINTHEAD DROPLET EJECTING TECHNIQUE

BACKGROUND OF THE INVENTION

This invention relates generally to the art of assynchronous ink jet printing, and more particularly to techniques for optimizing the driving droplet ejecting pulses.

There are many specific types of printhead structures which operate to eject on demand (assynchronously) a drop of ink with a sufficient velocity to travel in a straight trajectory to a writing medium. Such a printhead typically includes an enclosed chamber whose volume is suddenly reduced to eject a droplet of ink out through a nozzle. In some applications, a single such chamber is utilized by movement with respect to a writing medium in order to generate various types of patterns and characters. A printhead having a plurality of such independently controlled printing channels is most commonly used for writing wherein the array of nozzles is swept across a writing medium line by line with the appropriate number of channels fired at each location across the line to form the desired characters.

One specific multichamber printhead is described in U.S. Pat. Nos. 4,189,734—Kyser, et al, (1980), principally FIGS. 5 and 6, 4074,284—Dexter, et al. (1978), principally FIGS. 2-4 and in co-pending application Ser. No. 058,125, filed July 16, 1979. Each channel of these printheads includes a thin piezoelectric crystal bonded to a flexible cover of the ink chamber. When an appropriate electrical potential is applied to the crystal, the cover plate is deflected downward into a chamber to supply energy to eject a droplet from that channel's nozzle.

The typical voltage pulse applied to the deflecting crystal in such devices is a square wave whose leading edge provides the drop ejecting velocity. A natural resonance results in the pressure within the ink chamber oscillating by initially going to a negative value after the droplet ejecting positive pressure pulse. The negative pressure pulse causes ink driven through said nozzle during the preceding positive pressure pulse to be pulled back into the chamber, thereby breaking free a clean droplet of ink that has been impelled toward the writing medium. The pulse is terminated either at an instant to aid in generating the negative ink pressure to break off the ink droplet in this manner, or at an instant where it would be most beneficial to counteract the natural resonance of the system and bring it to rest as quickly as possible so that it will be ready to eject a subsequent droplet. The natural resonant frequency of the system is a limitation on the maximum rate of droplets that can be emitted.

In such prior art systems, the velocity of an ejected drop can be chosen at will by varying the energy content of the drive pulse or by changing the slope of its leading edge, but the volume of the drop, and thus the size of the resulting dot, cannot be controlled independently of the velocity.

Therefore, it is an object of the present invention to drive such a device with a volume reducing pulse wave form that brings it to rest in less time than current techniques and thus increasing the rate of drops that can be emitted but without sacrificing drop volume or velocity.

It is another object of the present invention to operate such devices to emit droplets of a desired volume with an increased velocity, thereby forming characters of higher quality and permiting the printhead to be positioned a further distance from the writing medium.

It is a further object of the present invention to provide independent control of the velocity and volume of the drop.

It is also an object of the present invention to provide an improved technique of driving such a printhead device that avoids cavitation.

SUMMARY OF THE INVENTION

These and additional objects are accomplished by the present invention, wherein, briefly, a driving signal is applied to a given channel when a droplet is desired to be emitted that suddenly increases the ink pressure within the chamber to a higher level than presently in order to push a plug of ink having a desired volume out through the nozzle and at an increased velocity, followed closely by a negative pressure being applied to the chamber to drive the ink pressure negative before it would normally do so if allowed to resonate naturally, thereby to break off a drop of ink from the plug previously pushed through the nozzle. The negative pressure pulse is then followed by a positive stabilization pulse to keep the negative pressure in the chamber above cavitation levels, and which is, lastly, followed by a relatively low negative pressure that further helps dampen the natural pressure oscillations within the chamber to ready it for a subsequent repeat of the process to eject another droplet.

According to a further aspect of the present invention, the initial pressure pulse is broken into two parts. The first part is an even larger pressure pulse designed to get the plug of ink quickly to its desired velocity. The second part is designed to maintain that velocity until the plug of ink extending from the nozzle contains enough ink for the volume of the resulting drop to be what is desired. This technique provides independent control of the velocity and volume of the drop. As a result, the grey tone of printing may be varied while at the same time maintaining a high drop velocity to minimize drop placement errors.

The externally applied pressure is most conveniently accomplished by changing the volume of the ink chamber such as by the bonded piezoelectric crystal and flexible plate combination described above but the technique can be applied with equal success to a wide variety of particular ink jet chamber structures that are in use or have been suggested. The complex volume variations are thus accomplished by applying to the driving crystal an appropriate voltage waveform.

Additional objects, advantages and features of the present invention will become apparent from the following description of a preferred embodiment thereof, which should be taken in conjunction with the accompanying drawings.

BRIEF DESCRIPTION OF THE DRAWINGS

FIG. 1 shows in cross-sectional view a single channel of a multi-channel printhead of the prior art in which the improved driving technique of the present invention is utilized;

FIGS. 3A through 3C illustrate the printhead of FIG. 1 at various instances of time indicated on the operating curves of FIGS. 2A through 2E;

FIG. 4 is an electronic block circuit diagram of the driving electronics in the printhead of FIG. 1 that operates it according to the characteristics shown in FIGS. 2A through 2E;

DESCRIPTION OF THE PREFERRED EMBODIMENTS

Figure 2A:
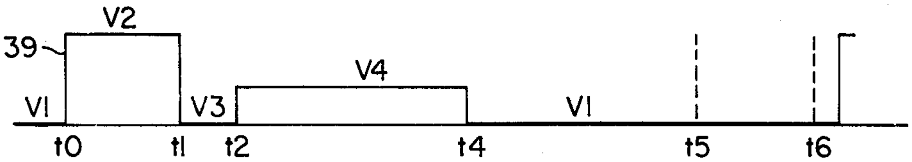
FIGS. 2A through 2E are waveforms showing the printhead of FIG. 1 operated according to one aspect of the present invention.

Referring initially to FIG. 1, a cross-sectional view of one type of printhead structure is shown in which the driving technique of the present invention may be employed. This printhead structure is described in more detail in aforementioned U.S. Pat. Nos. 4,189,734 and 4,074,284, which are hereby incorporated herein by reference. Enough of the structure of that type of printhead is described with respect to FIG. 1 so that the improved driving technique of the present invention can be understood.

A rigid printhead base plate 11 is covered by a flexible cover plate 13 to form an ink chamber 15 having a nozzle 17 through a wall of the base 11. The chamber 15 is, in this example, one of several chambers in a single printhead, all of them receiving ink from a pulse trap chamber 19 that is common to all channels. The chamber 15 is separated from an adjacent channel by a wall extending from the nozzle end and terminating at an edge 21.

Ink is supplied to the pulse trap 19 by a pressurized ink supply 23 through a fluid valve 25. The pressure of the ink within the chamber 19 is monitored by a sensor 27, detected by an electronic control circuit 29 which opens and closes the valve 25 to maintain a static pressure within the pulse trap chamber 19 within predetermined limits.

Bonded to a top surface of the cover plate 13 is a piezoelectric crystal 31 shown in FIG. 1 to be in its at rest position. When the crystal is appropriately energized by an electrical signal from driving electronics 33, however, the plate 13 is deflected downward into the chamber 15, as shown in dotted outline in FIG. 1. This deflection, by suddenly reducing the volume of the chamber 15, causes an ink droplet to be ejected through the nozzle 17. A single droplet is emitted in response to a signal from a controlling source 35. When commanded by that source, a droplet is emitted and projected in a straight trajectory to a writing medium 37.

Figure 2B:
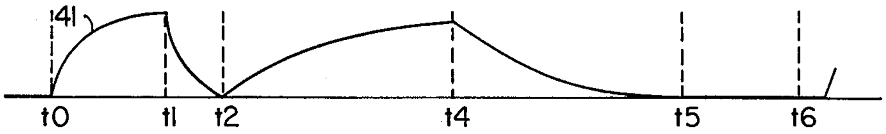
Figure 2C:
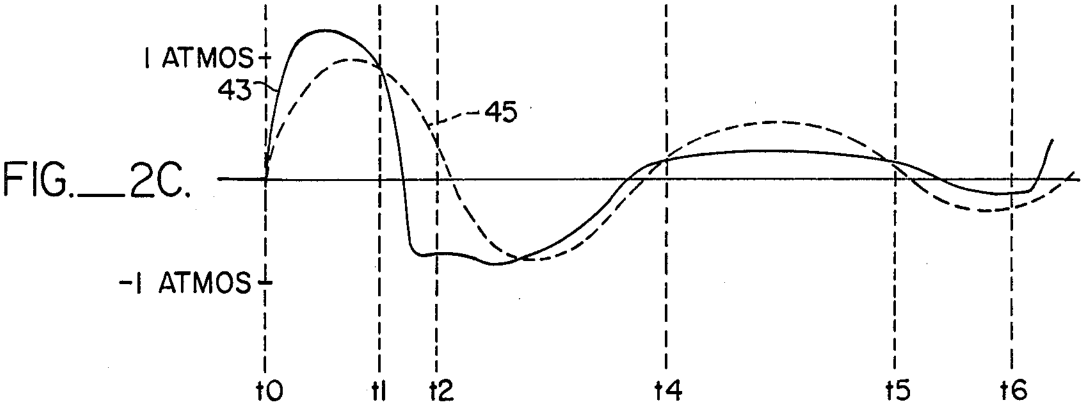

Referring to FIGS. 2A through 2C, the operation of a device of FIG. 1 in accordance with the technique of the present invention will be introduced. A square wave voltage waveform 39 shown in FIG. 2A is that applied to the crystal 31 through a current limiting resistance 32 (FIG. 4). The crystal acts in an equivalent circuit sense as a capacitor and thus a voltage wavevorm 41 appearing across the crystal 31 as a function of time is shown by FIG. 2B to have the characteristics of a capacitor that is impressed with a square wave voltage. A curve 41 also approximates the deflection of the plate 13 into the chamber 15 (FIG. 1) as a function of time, the deflection increasing as the voltage across its increases. A curve 43 of FIG. 2C shows the pressure variation of ink within chamber 15 that is caused by a voltage waveform of FIG. 2A being applied, Curve 45 shown in broken line form in FIG. 2C represents a pressure variation of the ink within the chamber 15 that is likely to result from a single square wave voltage pulse applied to the crystal 31 and continuing for the duration of the interval in the figures, rather than the more complex voltage waveform of FIG. 2A. It is this natural resonant characteristic that is utilized in most driving techniques and thus causes two significant limitations. The first limitation is the amount of time that must elapse between ejected droplets in order to allow the pressure variations to die out. A second disadvantage is that the magnitude of the positive going initial pulse is limited to that of the first negative going pulse that can be tolerated in order to avoid cavitation. Cavitation, which is the condition where vapor-filled cavities are generated in the ink, is undesirable since the gases formed will interfere with the printhead operation. The negative pressure must be limited to less than about one atmosphere in order to prevent cavitation and thus the initial positive pulsemust similarly be limited in the situation being described where the natural resonance of the system is not interferred with. The limitation on the positive going pulse limits the size and velocity of the ejected droplet.

In order to overcome the limitations imposed by the natural resonance of the system, a particular driving pulse signal of FIG. 2A is employed. At time t0, a starting signal is received from the signal source 35 and a leading edge of a positive voltage pulse occurs in the waveform 39. The voltage suddenly increases from the steady state, non-print voltage V1 to the magnitude of V2. This voltage differential is made higher than that used in systems relying on the natural resonance of the system. This results in more quickly pushing a plug of ink 47 (FIG. 3A) out of the nozzle 17 and with a higher ultimate droplet velocity. This is accomplished by the sudden reduction of volume of the chamber 15 by the high voltage applied to the crystal 31.

At time t1, the voltage is rapidly changed from V2 to V3, as shown in FIG. 2A, and remains at that level for a shorter time interval between t1 and t2. During this interval, the volume of the chamber 15 is rapidly increased, thus causing the pressure within the chamber 15 to go negative, as shown by curve 43 of FIG. 2C, before it ordinarily would if the natural resonance of the system was utilized, as shown by the dashed curve 45. A negative pressure occurring just before the time t2 accelerates the plug 47 of ink back through the nozzle 17 and begins the process of separating a droplet therefrom. A droplet 49 (FIG. 3B) is so separated at a slightly later time t3.

In the interval between times t2 and t4, a lower magnitude voltage pulse V4 (FIG. 2A) is applied to the crystal as a stabilization pulse to keep the negative pressure within the chamber 15 above that at which cavitation would occur; that is, the pressure is maintained at above a minimum of about one atmosphere negative pressure. As can be seen from FIG. 2B, the crystal plate more slowly is deflected into the chamber 15 than during the interval of between t0 and t1. The magnitude of the voltage pulse supplied controls the rate at which the volume of the chamber 15 is changed. The purpose of the pulse in the interval between times t0 and t1 is to accelerate a desired volume of ink out of the nozzle 17 as fast as possible while the goal of the drive voltage in the interval between times t2 and t4 is to moderate the magnitude of the negative going pressure pulse.

As soon as the pressure within the chamber goes positive, as shown slightly before time t4 by curve 43 or FIG. 2C, the moderating pulse is terminated and the crystal plate structure allowed to return to rest slowly, thereby applying a gradually decreasing negative pressure of moderately low magnitude to the ink in the chamber 15. This counteracts the tendency from the natural resonance of the system for the ink pressure to go to a high positive level. The dampening of this natural oscillation by applying by external means a counter pressure allows the system to return to a steady state equilibrium at a faster rate so that droplets of ink can be ejected at a higher frequency. At time t5, the volume of the chamber 15 has been restored to its initial steady state value. A short time later at time t6, the system has stabilized enough to enable the beginning of the process again to eject another droplet of ink, if desired.

Figure 2D:
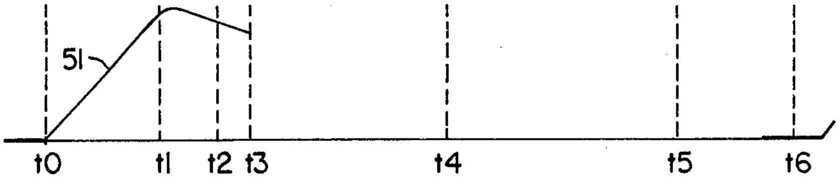

Curve 51 of FIG. 2D represents the velocity of the plug 47 of ink, beginning at 0 at time t0 at the beginning of the pulse of voltage V2 (FIG. 2A) that is applied to the crystal. When that voltage is released at time t1, the plug has slowed down somewhat, but still maintains sufficient velocity so that a droplet 49 is separated from it at time t3. The faster that a desired volume of ink is accelerated to the desired escape velocity, the shorter the droplet ejecting cycle can be and thus the higher the frequency of droplets that can be ejected by the system.

Figure 2E:
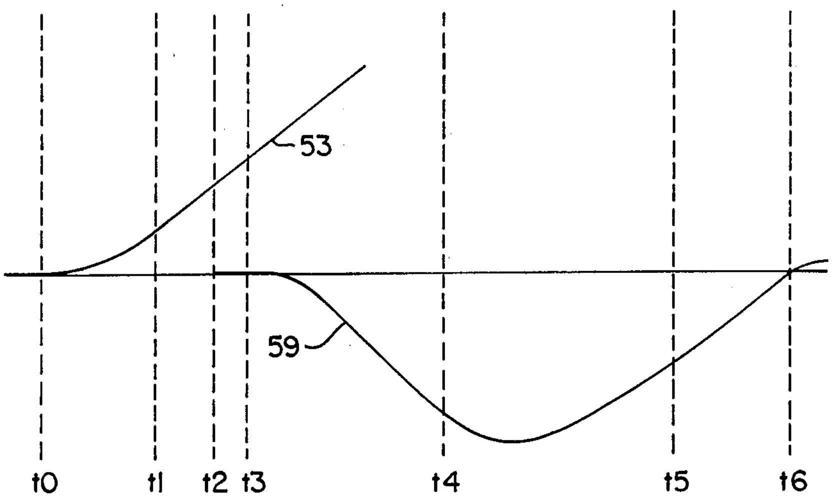

Referring to FIG. 2E, a curve 53 shows the position of the meniscus 55 (FIGS. 1 and 3A). When the drop 49 separates from the plug 47 of ink at time t3, a curve 53 is showing the position of the leading edge 55 of the droplet 49. The zero position in FIG. 2E is the position of the meniscus 55 when the system is at rest (FIG. 1). Movement of the meniscus toward the writing medium 37 is shown as a positive distance in FIG. 2E. Shortly after time t3, after the droplet has broken away, the new meniscus 57 (FIGS. 3B and 3C) is drawn back into the nozzle 17 further than its rest position and thus is shown as a negative position by curve 59 of FIG. 2E. By time t6, the meniscus has returned to its rest position and the system is ready to fire another droplet.

Although the particular system in which the improved driving technique of the present invention is being described is a selected one of many specific "demand" ink droplet projection structures, the same driving technique can be used with other structures as well. Driving a cylindrical transducer which forms the ink chamber in its middle can be similar. The use of multi-chambers or a plurality of deflecting crystals to eject a single droplet also can be employed with the technique of the present invention. Further, it is applicable to any pressure creating or volume reduction type of device, whether a peizoelectric crystal is the particular driving element or whether something else is chosen. Further, with all of these specific printhead structures, the particular voltage waveform that is applied to the crystal may differ somewhat from that of FIG. 2A but the advantages of the present system are carried out if the ink pressure variation characteristics described with respect to FIG. 2C result.

Referring to FIG. 4, a simple way of providing the driving electronics 33 is shown; certainly, many other circuits and techniques for forming the waveform 39 of FIG. 2A are apparent. A pulse from the signal source 35 starts a digital counter 61 to increment through its various counts under the control of a clock 63. A multi-line binary output of the counter 61 is received by a decoding circuit 65 which is designed to control voltage states of four output lines 67, 69, 71 and 73. The line 67 controls a switch 75, the line 69 a switch 77, the line 71 a switch 79 and the line 73 a switch 81. This system alternately connects one of the voltages V1, V2, V3 or V4 to the crystal 41 through the series resistence 32. The decoding circuit 35 assures that only one of the switches will be in its conductive state at a time. The counts of the counter 61 that are recognized by the decoder 65 to control which of the output lines 67, 69, 71 or 73 is to be "on" at various times occurr at times t0, t1, t2 and t4. These are the instants that the voltage applied to the crystal 31 is changed.

Figure 5A:
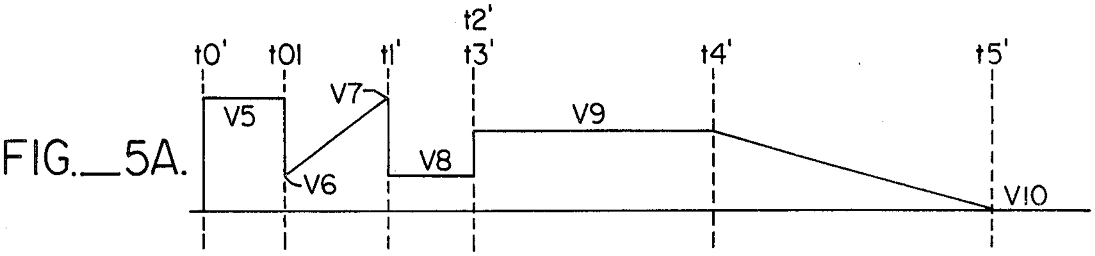
FIGS. 5A through 5C are waveforms showing the printhead of FIG. 1 operated according to another aspect of the present invention.
Figure 5B:
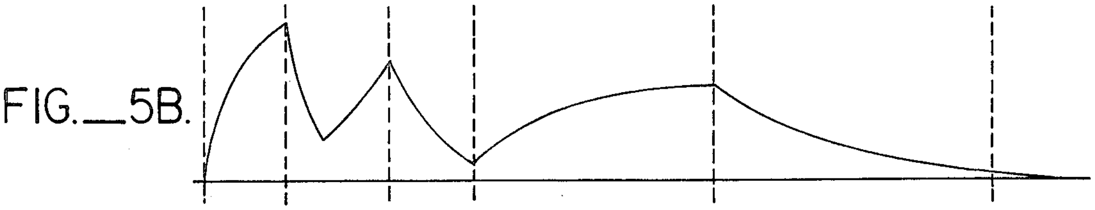
Figure 5C:
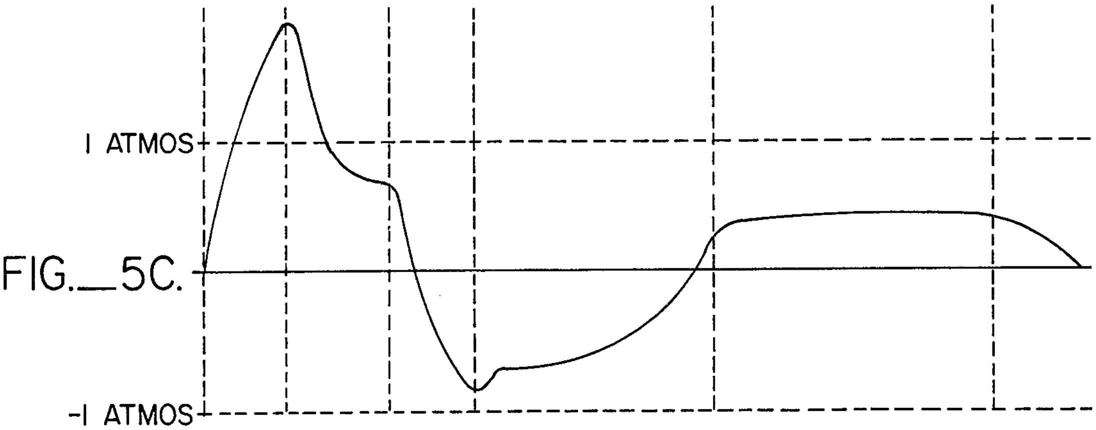

Another aspect of the present invention is described with respect to FIGS. 5A through 5C, and FIG. 6. This modified technique has all of the advantages of the previously described techniques plus the advantage of being able to independently control the velocity and volume of an ejected drop of ink. FIG. 5A shows the applied voltage to a piezoelectric crystal deflecting member, FIG. 5B a resulting voltage across the crystal itself which is proportional to its deflection into the ink chamber, and FIG. 5C shows the resulting pressure variation of the ink within the chamber. This operation is described with respect to instants of time t0–t1′, and so forth, which are meant to correspond to the times t0, t1 and so forth of the previously described technique of FIGS. 2A through 2E. The exact duration between these instants may be different but the conceptual operations performed between them is the same.

The main difference in this technique is that the single pulse of FIG. 2A between the times t0 and t1 is replaced in the driving pulse of FIG. 5A between the times t0′ and t1′ with, in effect, two different pulses having independent characteristics. The first of these two pulses is between the time t0′ and t01, and the second pulse is between t01 and t1′. The first pulse has a purpose of increasing velocity of ink through the nozzle from its rest position to a desired velocity of the resulting ejected drop in a very short period of time. This pulse preferably has a greater magnitude than that of the first pulse of FIG. 2A in order to reach the desired velocity in a shorter period of time. The second part of the initial pulse, between times t01 and t1′, is designed to maintain the plug of ink at this desired velocity until its volume is such that when a drop of ink breaks away from it, that drop will have a desired volume.

The ink drop velocity and volume can thus be independently controlled. The velocity is controlled by the duration and magnitude of the initial pulse portion between times t0′ and t01 of FIG. 5A. The volume of the ejected drop is controlled by the duration of the pulse between times t01 and t1′ where the velocity is maintained essentially constant.

The rapidly reduced voltage between times t1′ and t2′ of FIG. 5A causes the pressure within the ink chamber to go to a negative value and break off an ink droplet, which occurs at time t3′ that is substantially coincident with time t2′, depending upon the various parameters that are chosen. The voltage V9 between the times t2′ and t4′ adds an increase pressure to the chamber to prevent the negative pressure from going below the negative one atmosphere level that is highly undesirable. From time t4′ to t5′, a gently decreasing voltage is applied as shown in FIG. 5A, rather than the abrupt change of voltage at time t4 of FIG. 2A. This more gentle change may be incorporated in the technique describing with respect to FIGS. 2A through 2E, as an alternative, and has an advantage of more gently dampening the natural ink pressure resonance.

Figure 6:
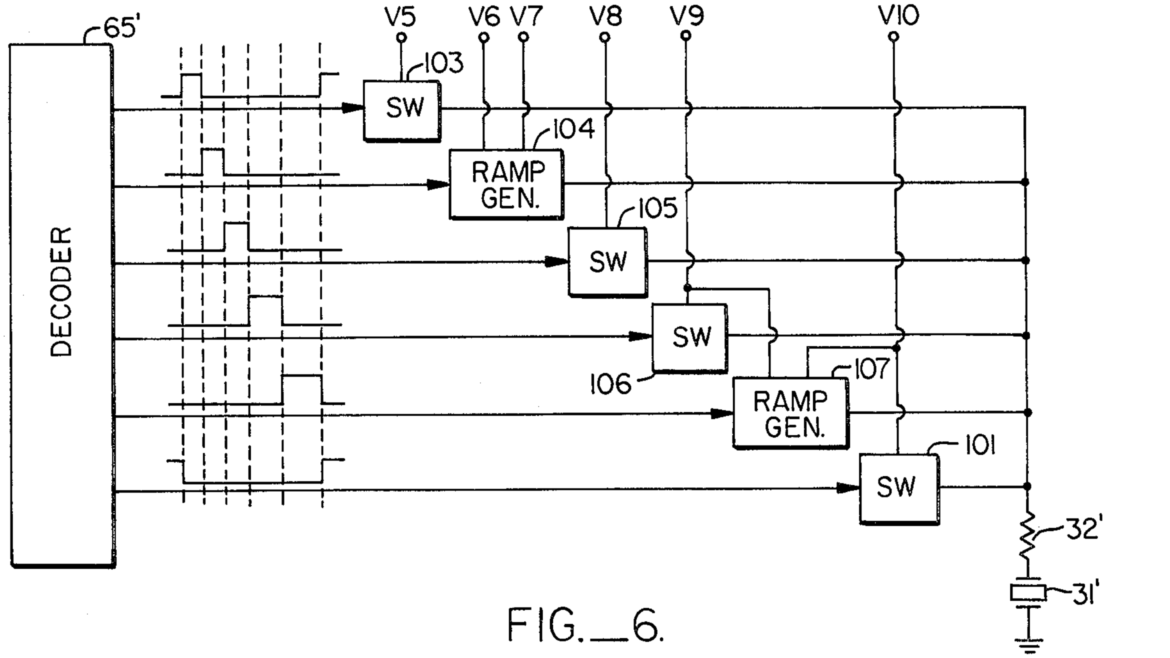
FIG. 6 is an electronic block circuit diagram of the driving electronics in the printhead of FIG. 1 that operates it according to the characteristics shown in FIGS. 5A through 5C.

Referring to FIG. 6, a modified portion of the driving electronics 33 of FIG. 4 is illustrated for driving the ink jet head of FIG. 1 in accordance with the characteristic curves just described with respect to FIGS. 5A through 5C. Those elements of FIG. 6 that are counterparts of those of FIG. 4 are shown with the same reference character but a prime (′) added thereto. A switch 101 of FIG. 6 maintains the voltage at level V10 at all times except when an ink drop is being ejected. This voltage value is generally zero. An initial pulse between the times t0′ and t01 of FIG. 5A is provided by a switch 103 that is turned on for that duration of time to connect one side of the crystal to the voltage V5. The next pulse portion is generated by a ramp generator 104 that varies the voltage from V6 at time t01 to V7 at time t1′. The next duration between the times t1′ and t2′ is provided by a switch 105 that connects the voltage V8 to the crystal. The higher voltage V9 is next connected between the times t2′ and t4′ by a switch 106. The gentle decline of the voltage between the times t4′ and t5′ is provided by a ramp generator 107 that is connected to the starting voltage V9 and to the ending voltage V10.

There are two inherent limitations in the technique described with respect to FIGS. 5A through 5C, and 6. The smallest dot that can be produced on a writing medium is that of a diameter approximately equal to the diameter of the nozzle 17 (FIG. 1) of the ink ejecting device. The largest dot that can be produced depends upon the ability of the volume reduction means to deflect sufficiently into the ink chamber to produce the required pressure. For the system described with a piezoelectric crystal bonded to a flat, flexible cover plate, the practical limitation is the voltage that can be applied across the crystal thickness. Although the principle of the pressure control variations to eject a simple single droplet have been described for a piezoelectric driven device, the same principles of operation would control for other ink pressure or volume control devices, except that the specific implementation of these principles would obviously be different.

Although the improved ink jet printhead driving technique has been described with respect to a specific example thereof, it will be understood that the invention is entitled to protection within the full scope of the appended claims.

I claim:

1. A method of ejecting a controlled droplet of ink from the nozzle of an ink jet printhead, wherein the nozzle is connected to an enclosed chamber, comprising the steps of:

suddenly reducing the volume in said chamber to accelerate the ink in said nozzle to the desired velocity;

suddenly increasing the volume in said chamber;

immediately reducing the volume in said chamber an amount less than in said first volume reduction step in a manner to maintain said ink at the desired velocity; and increasing the volume in said chamber to eject a droplet of ink, whereby the volume of ink in said droplet is a function of the duration of said second volume reduction step.

2. A method as recited in claim 1 further including the step of slowly reducing the volume in said chamber after the droplet has been ejected to reduce the magnitude of negative pressure in said chamber while dampening pressure variations therein.

* * * * *